(12) United States Patent
Nash

(10) Patent No.: US 10,029,600 B2
(45) Date of Patent: Jul. 24, 2018

(54) SLIDE OUT FOR FOOD TRUCKS

(71) Applicant: Susan Nash, Fair Oaks Ranch, TX (US)

(72) Inventor: Susan Nash, Fair Oaks Ranch, TX (US)

(*) Notice: Subject to any disclaimer, the term of this patent is extended or adjusted under 35 U.S.C. 154(b) by 0 days.

(21) Appl. No.: 15/262,928

(22) Filed: Sep. 12, 2016

(65) Prior Publication Data
US 2017/0015232 A1    Jan. 19, 2017

Related U.S. Application Data

(63) Continuation of application No. 14/514,037, filed on Oct. 14, 2014, now Pat. No. 9,446,702.

(51) Int. Cl.
*B60P 3/025* (2006.01)
*B60P 3/34* (2006.01)

(52) U.S. Cl.
CPC .............. *B60P 3/0257* (2013.01); *B60P 3/34* (2013.01)

(58) Field of Classification Search
CPC ...... B60P 3/34; B60P 3/36; B60P 3/38; B60P 3/39; B60P 3/42; B62D 21/14; B62D 33/08; B62D 63/061
USPC ......... 296/26.12, 26.13, 26.01, 26.03, 26.08, 296/26.09
See application file for complete search history.

(56) References Cited

U.S. PATENT DOCUMENTS

| | | | |
|---|---|---|---|
| 6,290,284 B1* | 9/2001 | Crean | B60P 3/34 296/168 |
| 6,422,628 B1* | 7/2002 | Bortell | B60P 3/14 296/26.13 |
| 6,565,144 B1* | 5/2003 | Crean | B60P 3/34 296/168 |
| 6,948,754 B2* | 9/2005 | Huffman | B60P 3/34 296/176 |
| 9,446,702 B2* | 9/2016 | Nash | B60P 3/0257 |
| 2002/0180232 A1* | 12/2002 | Schneider | B60P 3/40 296/26.01 |
| 2004/0017096 A1* | 1/2004 | Crean | B60P 3/34 296/175 |
| 2004/0256874 A1* | 12/2004 | Rex | B60P 3/34 296/26.13 |
| 2007/0164580 A1* | 7/2007 | Peter | B60P 3/34 296/26.13 |
| 2007/0194587 A1* | 8/2007 | Wolf | B60P 3/34 296/26.13 |
| 2008/0217945 A1* | 9/2008 | Barnes | B62D 21/14 296/26.13 |
| 2008/0315607 A1* | 12/2008 | Herson | B60P 3/34 296/26.13 |
| 2010/0219652 A1* | 9/2010 | Reske | B60P 3/34 296/26.13 |
| 2013/0106131 A1* | 5/2013 | Yoder | F16H 19/04 296/26.13 |

* cited by examiner

*Primary Examiner* — Gregory A Blankenship
(74) *Attorney, Agent, or Firm* — Jackson Walker LLP

(57) ABSTRACT

An improved slide out for food trucks, recreational vehicles, buses, and trailers is described in which the slide out that extends from below to above the top of the vehicle's wheels.

5 Claims, 5 Drawing Sheets

SLIDE OUT FOR FOOD TRUCKS

This application is a continuation of, and claims priority from, U.S. utility application Ser. No. 14/514,037, which is incorporated herein by reference.

BACKGROUND OF THE INVENTION

Field of the Invention

Applicant's invention is related to an improved slide out for food trucks, recreational vehicles, buses, and trailers. More particularly, it relates to a slide out that extends below the top of the vehicle's wheels.

Background Information

Many trucks and trailers have slide outs. Slide outs have been referred to by many different terms, such as slide out units, bump outs, glide outs, room additions, and others. As referred to herein, "slide out" is intended to mean any of these types of bus and trailer, room expanders. Further, there are many types of vehicles that incorporate slide outs. Specifically, food trucks, recreational vehicles, buses, trailers, and like vehicles, all have incorporated slide outs to expand the interior space of the vehicle. As described herein, the present invention is described as applicable to slide outs for food trucks. However, the invention and descriptions are equally applicable to any room expanders for any of the described vehicles. Thus, as used herein, "vehicle" refers to either or both automobiles (a wheeled, self-powered motor vehicles used for transporting passengers or cargo) and trailers (a wheeled, unpowered vehicle pulled behind a self-powered motor vehicle).

Conventional slide outs have their base above the vehicle's wheels. The present invention provides a novel slide out in which the top of the slide out is above the top of one or more wheels and the bottom of the slide out is below the top of one or more wheels.

SUMMARY OF THE INVENTION

The present invention is intended to conform to standard curb heights of six to eight inches; however, it is anticipated it can be conformed to other curb heights as well. In the food truck, the improved slide out provides a step for workers in the food truck to step down onto the floor of the improved slide out. In the slide out, common tools and machines necessary for the conduction of the food truck operation are provided, such as drawers, quick-serve dispenser items, soda fountains, and the like.

The slide out moves outwardly from the side of the food truck due to one or more motors. Four motors may be used at or near the corners of the slide out. Gears drive the slide out in and out from the body of the vehicle. The slide out runs on tracks. The improved slide out can be advantageous because sites and events often charge food trucks by the length of the vehicle. The improved slide out expands the interior of the food truck by widening it rather than lengthening it. However, when on the road and the slide out is not deployed, the truck box is of standard width.

The lower tracks and gears are below the top of the wheels of the vehicle.

The slide out may incorporate fire retardant in the fiberglass of the walls.

DETAILED DESCRIPTION OF THE PREFERRED EMBODIMENT

| | |
|---|---|
| 10 | slide out |
| 12 | slide out front |
| 14 | slide out window |
| 16 | slide out walls |
| 16A | slide out roof |
| 16B | slide out floor |
| 16C | slide out front wall |
| 16D | slide out back wall |
| 18 | tire |
| 18A | tire top |
| 20 | vehicle front |
| 22 | vehicle |
| 24 | wheel well |
| 24A | wheel well top |
| 26 | vehicle rear |
| 28 | slide out interior |
| 30 | tracks |
| 100 | curb |
| 105 | roadway |
| 110 | curb level |

Figure 1:
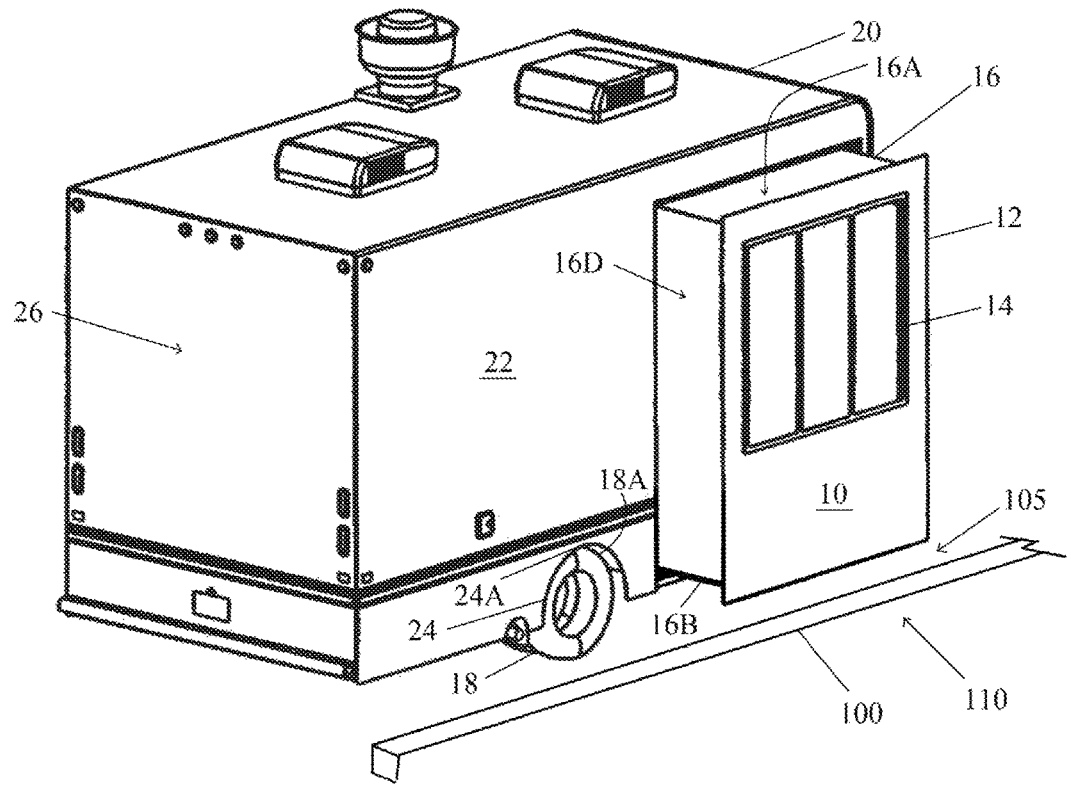
FIG. 1 is a perspective view of the present invention with the slide out extended.

As illustrated in FIG. 1, the improved slide out 10 can be extended from the side of the vehicle 22. The bottom 16B of the improved slide out 10 is designed to extend from below the top of the vehicle tires 18A, while the roof 16A of the slide out 10 is above the top of the wheel wells 24A. It is anticipated that the slide out 10 can be situated on the vehicle 22 either between the wheel well 24 and the front 20 of the vehicle 10, between the wheel well 24 and the rear 26 of the vehicle 22, or in front or behind the wheel well 24 and extending over the wheel well 24. The present invention is intended to include more than just a facia in which the slide out front 12 extends below the top of the wheel well 24A. It is intended that the slide out interior 28, created by the slide out walls 16, extend both above and below the top of the wheel well 24A.

The lower slide out floor 16B, as compared to conventional slide outs, allows for the food truck worker to be at or near eye level with customers who may be standing on the roadway 105, on the curb 100, or at curb level 110. This can be important for customer service reasons because the slide out window 14 is at a lower level relative to potential customers as compared to conventional food truck slide outs. Additionally, food items, including potentially hot items capable of burning customers, are held in front of the customer rather than high above their heads. Thus, the likelihood of the customer accidentally spilling scalding liquids or other food items on themselves less likely. It also makes ordering items easier because the worker and the customer can see each other's face and hear each other better through the window 14. It is important to note that the improved slide 10 out does not just have a front that extends below the top of the adjacent tires 18 but, rather, the interior room extends from above to below the top of the tires 18. Thus, the bottom 16B, or floor, of the improved slide out 10 is at a level lower than the top of the vehicle's 22 adjacent wheel wells 24 while the top 16A, or roof, is above the wheel wells 24. However, the front 12 may extend beyond the walls 16 such that the slide out appears larger than the interior 28. The front 12 may extend from as far as the top of the vehicle 22 to its bottom.

It is anticipated that the slide out interior 28 created by the slide out walls 16 will be sized in order to allow a worker stand inside the slide out interior 28. Further, the floor 16B of the improved slide out 10 is within 18 inches of the top of a standard six- to eight-in curb 100.

Figure 2:
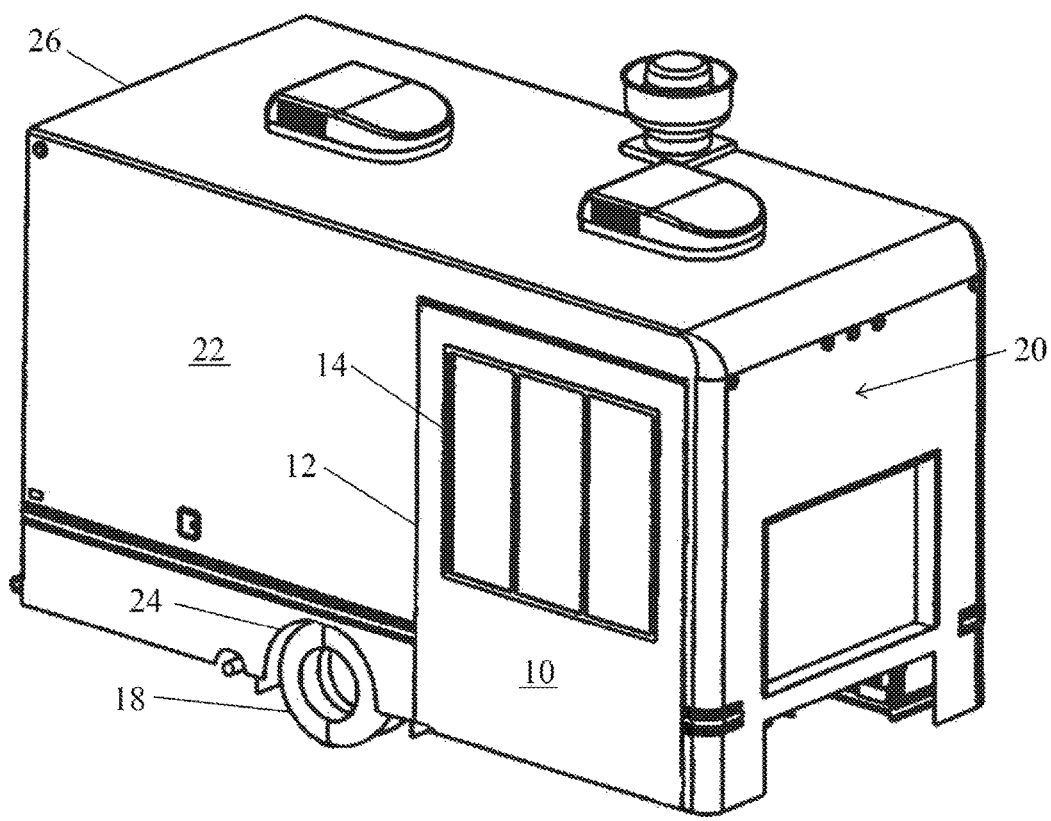
FIG. 2 is a perspective view of the present invention with the slide out withdrawn.

FIG. 2 illustrates the improved slide out 10 and shows it in the closed position. As an example, FIG. 2 illustrates a slide out front 12 that extends from the bottom of the vehicle 22 upward to near the top of the vehicle 22. While shown in FIG. 2 as placed toward the front 20 of the vehicle 22 in front of the wheel wells 24 and tires 18, is anticipated that the slide out 10 could also be manufactured toward the back 26 of the vehicle 22 behind the wheel wells 24, or directly above the wheel wells 24 and extending below the wheel wells 24 either to the front or back of the wheel wells 24 such that the lowest portion of the slide out floor 16B is below the top of the wheel well 24A. Thus, the slide out floor 16B may extend from directly above the wheel well 24 downwardly, either to the front or rear of said wheel well 24, to below level with the wheel well top 24A.

Figure 3:
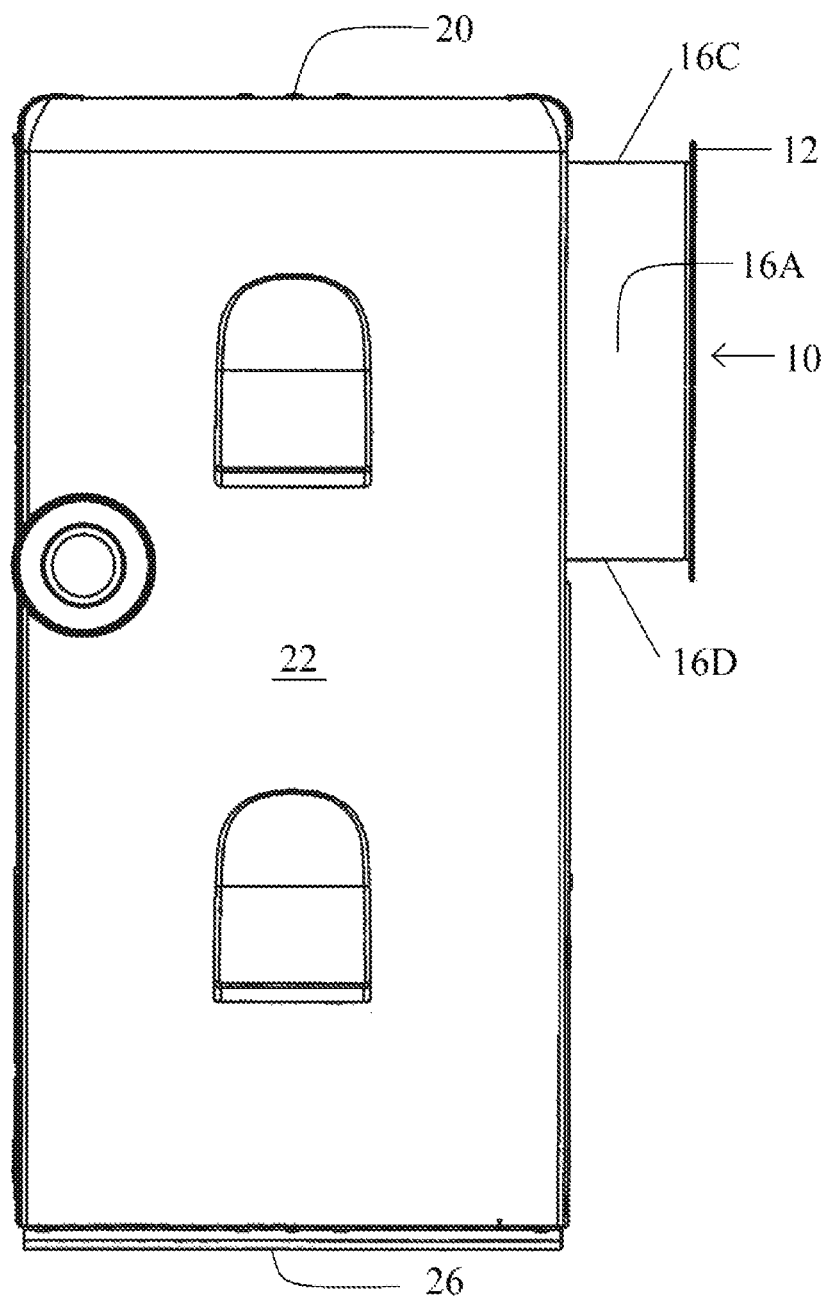
FIG. 3 is a top view of the present invention with the slide out extended.

FIG. 3 shows a top view of the vehicle 22 with the slide out 10 in the extended position. As shown in this figure, the walls 16A, 16B, 16C, and 16D form an interior 28 that extends from the standard vehicle 22 interior. The slide out front 12 completes the front of the interior 28. The interior 28 is open to the interior of the vehicle 22 and can be accessed from the vehicle's interior, generally using a step down. As discussed previously, the slide out 10 may be positioned anywhere along the side of the vehicle 22. However, it will generally be advantageous for the slide out 10 to be positioned on the curb 100 side of the vehicle. The curb 100 side of the vehicle may change depending upon local law and driving standards.

Figure 4:
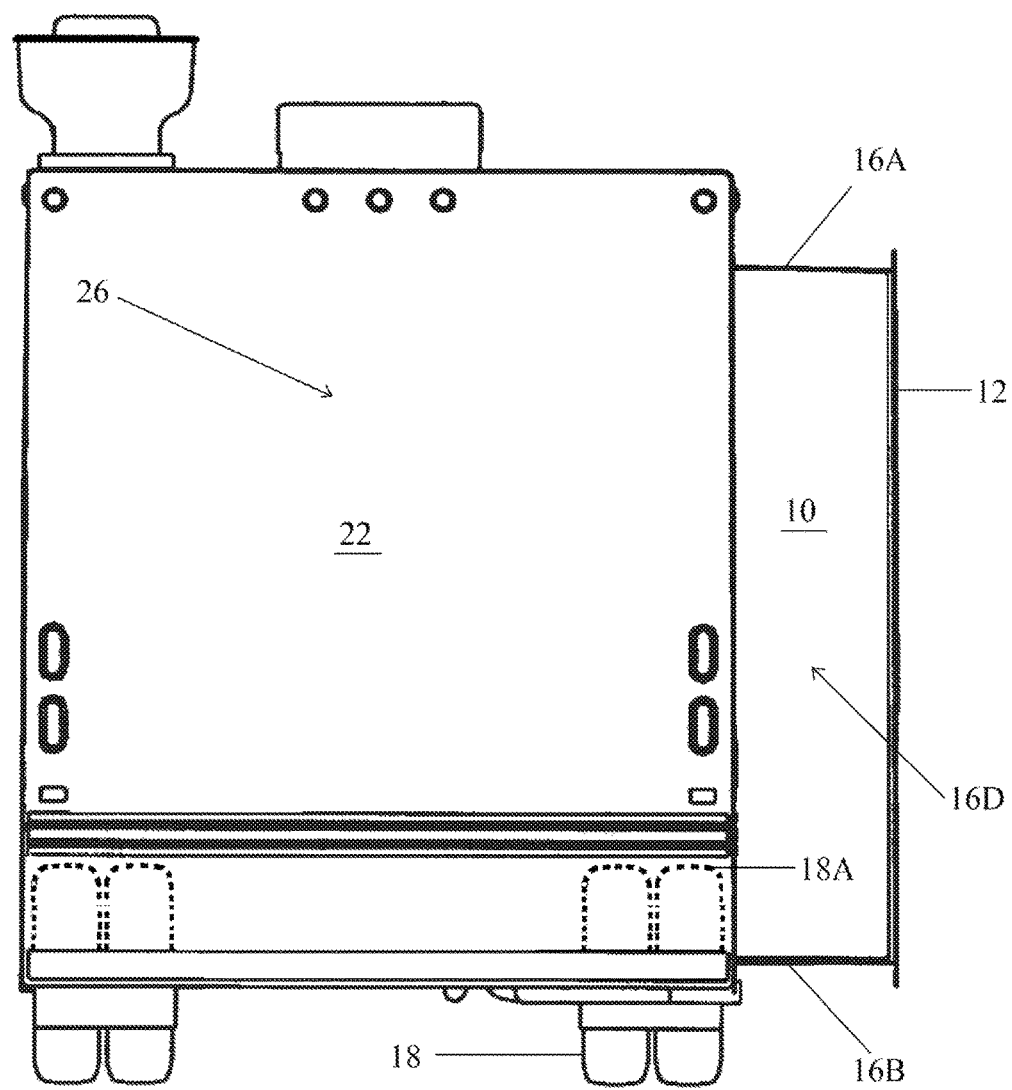
FIG. 4 is a back view of the present invention with the slide out extended.

FIG. 4 is a rear view of the vehicle 22 and illustrates the slide out 10 in the extended position from the rear 26. As can be seen from this figure, the slide out 10 extends outwardly from the vehicle 22 and additional space is created by the slide out walls 16 which define the slide out interior 28. Customers can stand on the outside of the vehicle 22 looking into the window 14 at a position closer to eye level than conventional slide out which said above the top of the tires 18A. This figure includes ghosted images of the top portion of the tires 18 in dotted lines in order to better illustrate how the slide out 10 extends above and below the top of the tires 18A.

Figure 5:
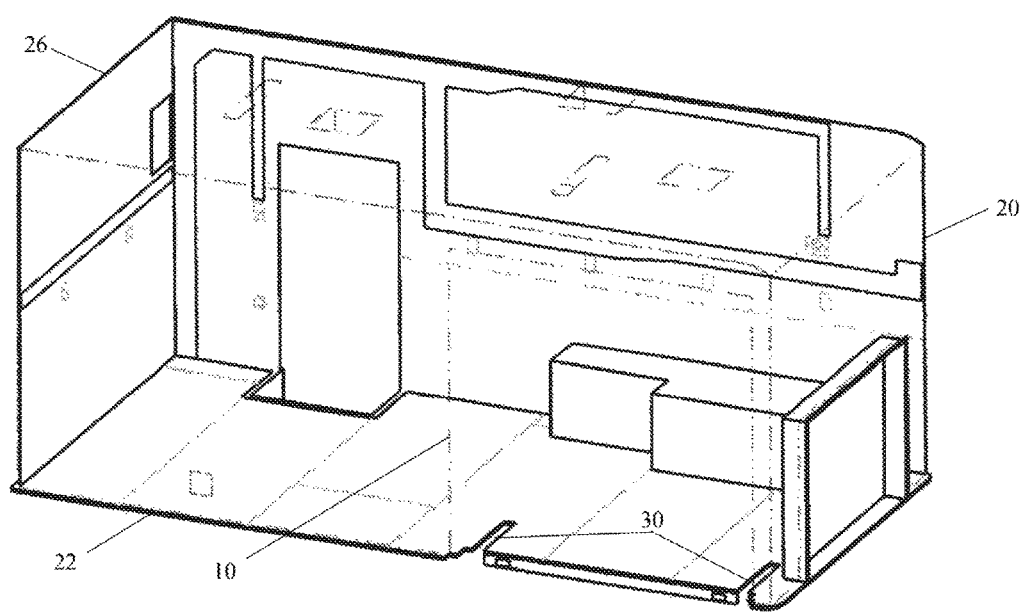
FIG. 5 is a cutaway, perspective view of the present invention.

FIG. 5 is a perspective, cutaway view of the vehicle showing the interior of the vehicle 22. In order to manufacture the improved slide out 10, modifications to the vehicle 22 are required that are not seen on conventional vehicles. The lower gearing and slides or tracks 30 for the slide out 10 must be below the top 18A of the vehicle's wheel wells 24. Thus, the bottom of the slide out is near or slightly above the height of a standard curb. The bottom of the slide out may be 4 to 26 inches above the roadway or ground level 105. Upper gearing and slides for tracks (not shown) that are complementary to the bottom tracks 30 may also be provided near the top of the slide out 10 and extending into the vehicle 22 near the top. It is generally anticipated that the tracks 30, both upper and lower, will be positioned near the corners of the slide out 10, and where at least one of said tracks 30 is below said top 24A of said wheel well 24, and at least one of said tracks 30 is above said top 24A of said wheel well 24.

The interior of the vehicle may provide a step-down into the improved slide out 10 interior 28. Tools and equipment in the improved slide out 10 interior 28 are arranged or deployed such that when the slide out 10 is retracted, the equipment will not hinder retraction of the slide out 10. Storage is also available under the floor of the vehicle's interior and may be accessible from the interior 28 the slide-out 10. Tools and equipment desirable for use in the slide out 10, can be stored out of the way, then accessed when the slide out 10 is extended from the side of the vehicle 22.

I claim:

1. A slide out comprising:

said slide out delineated by a floor, a roof, a front wall, a rear wall, and a front, wherein said slide out has an interior;

a wheeled vehicle having a front, a rear, and two sides, wherein said vehicle has a wheel well with a wheel well top along said side of said vehicle and inside of which is a tire;

said slide out movably attached to said side of said vehicle via a bottom track and a top track that allow said slide out to move outwardly from said side of said vehicle and inwardly such that said slide out front is generally flush with said vehicle side;

wherein said bottom track is below said wheel well top and said top track is above said wheel well top;

wherein said wheeled vehicle further comprises a floor; and wherein said slide out floor is lower than said wheeled vehicle floor.

2. The slide out of claim 1, further comprising a storage area between said wheeled vehicle floor and said slide out floor.

3. The slide out of claim 1, wherein said slide out floor is at a height such that a worker standing in said slide out on said slide out floor is at or near eye level with a customer standing outside said slide out on a roadway or on a curb.

4. The slide out of claim 1, wherein a step in the interior of said slide out allow access to said slide out interior for a worker inside said food truck.

5. A slide out comprising:

said slide out delineated by a floor, a roof, a front wall, a rear wall, and a front, wherein said slide out has an interior;

a wheeled vehicle having a front, a rear, and two sides, wherein said vehicle has a wheel well with a wheel well top along said side of said vehicle and inside of which is a tire;

said slide out movably attached to said side of said vehicle via a bottom track and a top track that allow said slide out to move outwardly from said side of said vehicle and inwardly such that said slide out front is generally flush with said vehicle side;

wherein said bottom track is below said wheel well top and said top track is above said wheel well top;

a front slot in said wheeled vehicle floor;

a rear slot in said wheeled vehicle floor;

wherein said front wall moves partially through said front slot when said slide out is moved outwardly or inwardly; and wherein said rear wall moves partially through said rear slot when said slide out is moved outwardly or inwardly.

\* \* \* \* \*